(12) United States Patent
Okamoto

(10) Patent No.: US 6,803,969 B2
(45) Date of Patent: Oct. 12, 2004

(54) VIDEO SIGNAL PROCESSING APPARATUS FOR DIGITAL VIDEO DECODER

(75) Inventor: Yasuhiko Okamoto, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 381 days.

(21) Appl. No.: 09/875,292

(22) Filed: Jun. 7, 2001

(65) Prior Publication Data

US 2002/0186773 A1 Dec. 12, 2002

(51) Int. Cl.$^7$ ................................................ H04N 5/21
(52) U.S. Cl. ........................ 348/607; 348/571; 348/441
(58) Field of Search ................................. 348/441, 571, 348/572, 607, 616, 618, 725, 625, 581

(56) References Cited

U.S. PATENT DOCUMENTS 6,018,366 A  *  1/2000  Asai et al. ............. 375/240.18
6,339,434 B1 *  1/2002  West et al. .................. 345/667
6,573,940 B1 *  6/2003  Yang ........................... 348/441

* cited by examiner

Primary Examiner—Victor R. Kostak
(74) Attorney, Agent, or Firm—Volentine Francos, PLLC

(57) ABSTRACT

A video signal processing apparatus which is provided for a digital video decoder and can automatically and properly adjust a fluctuation of the number of sampling data of digital composite video signals includes: an adjusting circuit which performs a partial adding/deleting process to the video signals so as to correct the fluctuation in number of sampling data constructing the digital composite video signals supplied to the decoder; and a discriminating circuit which compares the number of sampling data of each video signal and the preset reference number of sampling data and outputs an operation signal for the adding/deleting process to the adjusting circuit when a difference between them as a comparison result lies within a predetermined adjusting range.

15 Claims, 7 Drawing Sheets

VIDEO SIGNAL PROCESSING APPARATUS FOR DIGITAL VIDEO DECODER

BACKGROUND OF THE INVENTION

1. Field of the Invention

The invention relates to a video signal processing apparatus which is provided for a digital video decoder for decoding digital composite video signals in order to reconstruct an image from the digital composite video signals and, more particularly, to a video signal processing apparatus for suppressing a fluctuation of the number of sampling data of the digital composite video signals.

2. Related Background Art

Hitherto, an analog composite video signal having information of one scanning line of an image is sampled at a predetermined sampling period, so that resultant digital composite video signals are sequentially supplied to a digital video decoder. Each of the analog composite video signals constructed on a scanning line unit basis includes: sync signals such as horizontal sync signal and vertical sync signal; a luminance signal and a chroma signal of one scanning line; and the like.

When a fluctuation occurs in the period of each of the analog signals due to a change of a radio wave propagating situation of each of the analog composite video signals or the like, a fluctuation occurs in the number of sampling data in each digital composite video signal corresponding to each analog signal in association with the fluctuation of the period. If the digital composite signal in which the number of sampling data, that is, the number of pixel data for one scanning line does not coincide with a predetermined reference value continuously, for example, for one field, it becomes a cause of disturbance of a reproduced video image.

Hitherto, an adjusting circuit is provided to suppress the disturbance of the image due to the fluctuation of the number of pixel data. According to the adjusting circuit, when the disturbance as mentioned above occurs in the image, an operation signal for a partial adding/deleting process of the digital signals can be manually properly supplied to the adjusting circuit.

By the operation of the adjusting circuit based on the operation signal, a predetermined number of digital data of a pixel data unit can be added or deleted to/from the position corresponding to a blanking portion of the analog signal in each digital composite video signal in accordance with the fluctuation of the number of pixel data, so that the fluctuation of the number of pixel data in the digital signals can be corrected.

It is, however, not easy that each time the disturbance starts to occur in the image, a chain of adjusting operations including a discrimination about whether the adjusting operation should be performed or not is executed by the manual operation as mentioned above. It is, therefore, demanded to automatize the chain of adjusting operations mentioned above.

On the other hand, there are: an adjusting mode in which the digital data is partially added or deleted to/from each digital composite video signal in order to correct the number of pixel data of the received digital composite video signals; and a non-adjusting mode in which such an adjustment is unnecessary for the digital video signals because of the coincidence between the numbers of pixel data and the reference value. If a mode switching is caused between both the adjusting mode and the non-adjusting mode due to the frequent switching operations between the operation and the non-operation of the adjusting circuit, contrarily, the reproduced image is liable to become unstable.

Therefore, even if a difference occurs temporarily between the number of pixel data for one scanning line and the reference value, when such a difference is very small, it is desirable not to perform the adjusting operation upon elimination of an unstable factor due to the frequent mode switching operations.

When the difference due to the dissidence mentioned above is large enough to exceed a predetermined range, there is a case where it is better not to perform the adjusting operation in the decoder.

As mentioned above, upon automatization of the adjustment of the number of sampling data for the purpose of obtaining the stable image, for example, with respect to the sum of the differences of every field, there is a proper adjusting range which shows a criterion about whether the adjusting operation should be performed or not. The adjustment in a range out of the adjusting range contrarily enhances instability of the image.

SUMMARY OF THE INVENTION

It is, therefore, an object of the invention to provide a video signal processing apparatus which automatically and properly adjusts a fluctuation of the number of sampling data of digital composite video signals in association with a fluctuation of a period of an analog composite video signal, thereby enabling a disturbance of a reproduced image to be easily and properly suppressed.

To accomplish the above object, according to the first aspect of the invention, there is provided a video signal processing apparatus which is provided for a digital video decoder for decoding continuous digital composite video signals in order to suppress a fluctuation of the number of sampling data constructing each of the digital composite video signals to be processed by the decoder, comprising: an adjusting circuit which executes a partial adding/deleting process to each of the digital composite video signals in order to correct the fluctuation of the number of sampling data of each of the digital composite video signals; and a discriminating circuit which compares the number of sampling data of each of the digital composite video signals with a reference number of sampling data of each of the digital composite video signals, discriminates whether the number of sampling data of the digital composite video signals should be increased or decreased on the basis of a difference obtained as a result of the comparison, and when the difference lies within a predetermined adjusting range, outputs an operation signal for increasing or decreasing the number of sampling data to the adjusting circuit in order to allow the adjusting circuit to execute the adding/deleting process.

According to the second aspect of the invention, in the apparatus of the first aspect, the discriminating circuit counts the number of sampling data with respect to each of a predetermined number of digital composite video signals, accumulates a difference between each of the count values obtained by the discriminating circuit and the reference number of sampling data, and outputs the operation signal when a result of the accumulation lies within the predetermined adjusting range.

According to the third aspect of the invention, in the apparatus of the second aspect, the predetermined number of digital composite video signals correspond to a scanning field which is specified between the digital composite video signals each having a vertical sync signal, and the predetermined adjusting range is given with respect to the accumulation of the differences with regard to a plurality of digital composite video signals in the field.

According to the fourth aspect of the invention, in the apparatus of the second aspect, in order to eliminate instability of image processes accompanied by the frequent switching operations between an adjusting mode in which the number of sampling data is increased or decreased and a non-adjusting mode in which the increase or decrease of the number of sampling data is not performed, as such an adjusting range for the discriminating circuit, there are provided: a first adjusting range which is used in the adjusting mode and specified by a pair of threshold values; and a second adjusting range which is specified by a pair of threshold values different from those threshold values and used in the non-adjusting mode.

According to the fifth aspect of the invention, in the apparatus of the fourth aspect, the first adjusting range includes the second adjusting range, so that hysteresis characteristics are given to switching characteristics between both the modes.

According to the sixth aspect of the invention, in the apparatus of the first aspect, each of the digital composite video signals is video information of a scanning line unit including a blanking portion, and the adding/deleting process is an increase/decrease of the blanking portion.

According to the seventh aspect of the invention, in the apparatus of the second aspect, the adjusting circuit comprises: a memory which is a memory for storing each of the digital composite video signals and has a data insertion/extraction port for performing the adding/deleting process to the signal; and a control unit which manages the memory by FIFO system and performs the adding/deleting process to each of the digital composite video signals when the control unit receives the operation signal from the discriminating circuit.

According to the eighth aspect of the invention, in the apparatus of the second aspect, the discriminating circuit comprises: a sync signal detecting unit which detects a horizontal sync signal provided for each of the composite video signals and a vertical sync signal provided for each digital signal group consisting of a predetermined number of composite video signals from the continuous digital composite video signals; a counter which counts the number of sampling data of each of the digital composite video signals and whose count value is reset to an initial value every detection of the horizontal sync signal by the detecting unit; a first register which holds a count value obtained by the counter; a first arithmetic operating unit which sequentially performs the calculation of the difference between the count value held in the register and the reference number of sampling data and performs the accumulation of each of the calculated result; a second register which stores an accumulation value obtained by the arithmetic operating unit and whose accumulation value is reset to an initial value every detection of the vertical sync signal by the detecting unit; and a discriminating unit which performs the discrimination by using the accumulation value every reset of the register.

According to the ninth aspect of the invention, in the apparatus of the eighth aspect, the sync signal detecting unit has a horizontal sync signal detecting circuit for detecting the horizontal sync signal and a vertical sync signal detecting circuit for detecting the vertical sync signal, the horizontal sync signal detecting circuit sends a signal for resetting the count value of the counter, and the vertical sync signal detecting circuit sends a signal for resetting the accumulation result in the second register.

According to the tenth aspect of the invention, in the apparatus of the eighth aspect, the arithmetic operating unit comprises: a subtracting circuit which calculates the differential number of sampling data; and an adding circuit which sequentially accumulates a result of the calculation performed by the subtracting circuit.

According to the eleventh aspect of the invention, in the apparatus of the eighth aspect, the discriminating circuit compares each of the differences in the digital signal group, obtains a maximum difference among the differences from a maximum value and a minimum value obtained by the comparison, discriminates whether each of the maximum difference and the accumulation result lies within a predetermined adjusting range or not, and discriminates whether the number of sampling data of the digital composite video signals should be increased or decreased by using each of the discriminated results.

According to the twelfth aspect of the invention, in the apparatus of the eleventh aspect, the discriminating circuit further has a second arithmetic operating unit which obtains the maximum difference between the maximum value and the minimum value, and the second arithmetic operating unit obtains the maximum difference every detection of the vertical sync signal in the sync signal detecting unit.

According to the thirteenth aspect of the invention, in the apparatus of the twelfth aspect, the discriminating unit has: a first discriminating circuit unit which discriminates whether the accumulation value that is held in the second register lies within a preset adjusting region or not; and a second discriminating circuit unit which discriminates whether the maximum difference of the second arithmetic operating unit lies within another preset adjusting region or not, and the discriminating unit makes a general decision regarding the increase/decrease of the number of sampling data on the basis of both decision results of both of the first and second discriminating circuit units.

According to the fourteenth aspect of the invention, in the apparatus of the thirteenth aspect, the discriminating unit makes the general decision on the basis of the AND of both of the decision results.

According to the fifteenth aspect of the invention, in the apparatus of the thirteenth aspect, upon operation in the adjusting mode in which the increase/decrease of the number of sampling data is performed, when the first discriminating circuit unit determines that the accumulation value does not exist in the adjusting region and the second discriminating circuit unit determines that the maximum difference value does not exist in the adjusting region, the discriminating unit makes the general decision so as to switch from the adjusting mode to the non-adjusting mode.

According to the sixteenth aspect of the invention, in the apparatus of the thirteenth aspect, upon operation in the non-adjusting mode in which the increase/decrease of the number of sampling data is not performed, when the first discriminating circuit unit determines that the accumulation value exists in the adjusting region and the second discriminating circuit unit determines that the maximum difference value exists in the adjusting region, the discriminating unit makes the general decision so as to switch from the non-adjusting mode to the adjusting mode.

According to the seventeenth aspect of the invention, in the apparatus of the thirteenth aspect, in order to eliminate instability of image processes accompanied by frequent switching operations between the adjusting mode in which the number of sampling data is increased or decreased and the non-adjusting mode in which the increase or decrease of the number of sampling data is not performed, the adjusting region for the first discriminating circuit unit comprises a first adjusting range which is used upon operation in the adjusting mode and specified by a pair of threshold values and a second adjusting range which is specified by a pair of threshold values which are different from the threshold values and used in the non-adjusting mode, and the adjusting region for the second discriminating circuit unit comprises a third adjusting range which is used upon operation in the adjusting mode and specified by a pair of threshold values and a fourth adjusting range which is specified by a pair of threshold values which are different from the threshold values in the third adjusting range and used in the non-adjusting mode.

According to the eighteenth aspect of the invention, in the apparatus of the seventeenth aspect, the first adjusting range includes the second adjusting range and the third adjusting range includes the fourth adjusting range, so that hysteresis characteristics are given to switching characteristics between both modes in the first and second discriminating circuit units.

According to the nineteenth aspect of the invention, in the apparatus of the seventeenth aspect, each of the first and second discriminating circuit units sets a decision result in each mode as a temporary decision result, makes a final decision on the basis of the temporary decision results and history of a plurality of temporary decision results so as to suppress a frequent inversion of each of the decision result, and the discriminating circuit makes the general decision on the basis of both of the final decision results made by both of the discriminating circuit units.

The above and other objects and features of the present invention will become apparent from the following detailed description and appended claims with reference to the accompanying drawings.

DETAILED DESCRIPTION OF THE PREFERRED EMBODIMENTS

Embodiments of the invention will be specifically explained hereinbelow.

Embodiment 1

For example, in a television system such as an NTSC (National Television System Committee) system which has conventionally been well known, a horizontal sync signal is provided for every analog composite video signal having information for one scanning line of an image. An interval from one horizontal sync signal to a new subsequent horizontal sync signal, that is, an interval corresponding to one scanning line specifies one period of the analog video signal.

A vertical sync signal is also provided for every scanning field which is specified by a plurality of analog video signals obtained through a predetermined number of horizontal sync signals. Each of the sync signals is provided in a blanking portion showing a blanking erasing period in the analog video signals. According to the NTSC system, as for the analog composite video signals, the horizontal sync signal is given every 1/15.734 kHz, the vertical sync signal is given every 1/59.94 MHz, and the number of scanning lines per field is equal to about 263.

The analog composite video signal corresponding to each scanning line is sampled at a predetermined sampling period, so that it is divided into pixel data group and a digital composite video signal is constructed by the pixel data group. The number of pixel data corresponding to one period of the analog composite video signal, that is, the number of pixel data of each digital composite video signal is fundamentally specified by a clock frequency of an apparatus which executes the sampling process. For example, when the clock frequency is equal to 13.5 MHz, the reference number of pixel data per scanning line is equal to 858.

To reconstruct a video image from such digital composite video signals, the digital video signals are sequentially supplied to a digital video decoder which has conventionally been well known, so that a predetermined decoding process is performed to each digital video signal.

As mentioned above, the analog composite video signal of one period is sampled on the basis of the predetermined clock frequency, so that the pixel data group constructing one digital composite video signal is formed. Therefore, if the period of the analog video signal is compressed or decompressed due to a change in radio wave propagating situation, the number of data in the pixel data group fluctuates in association with the compression or decompression of the analog signal. Thus, the number of pixel data is out of a reference value as mentioned above. Such a fluctuation of the number of pixel data as mentioned above can become a cause of disturbance of a reproduced video image.

Figure 1:
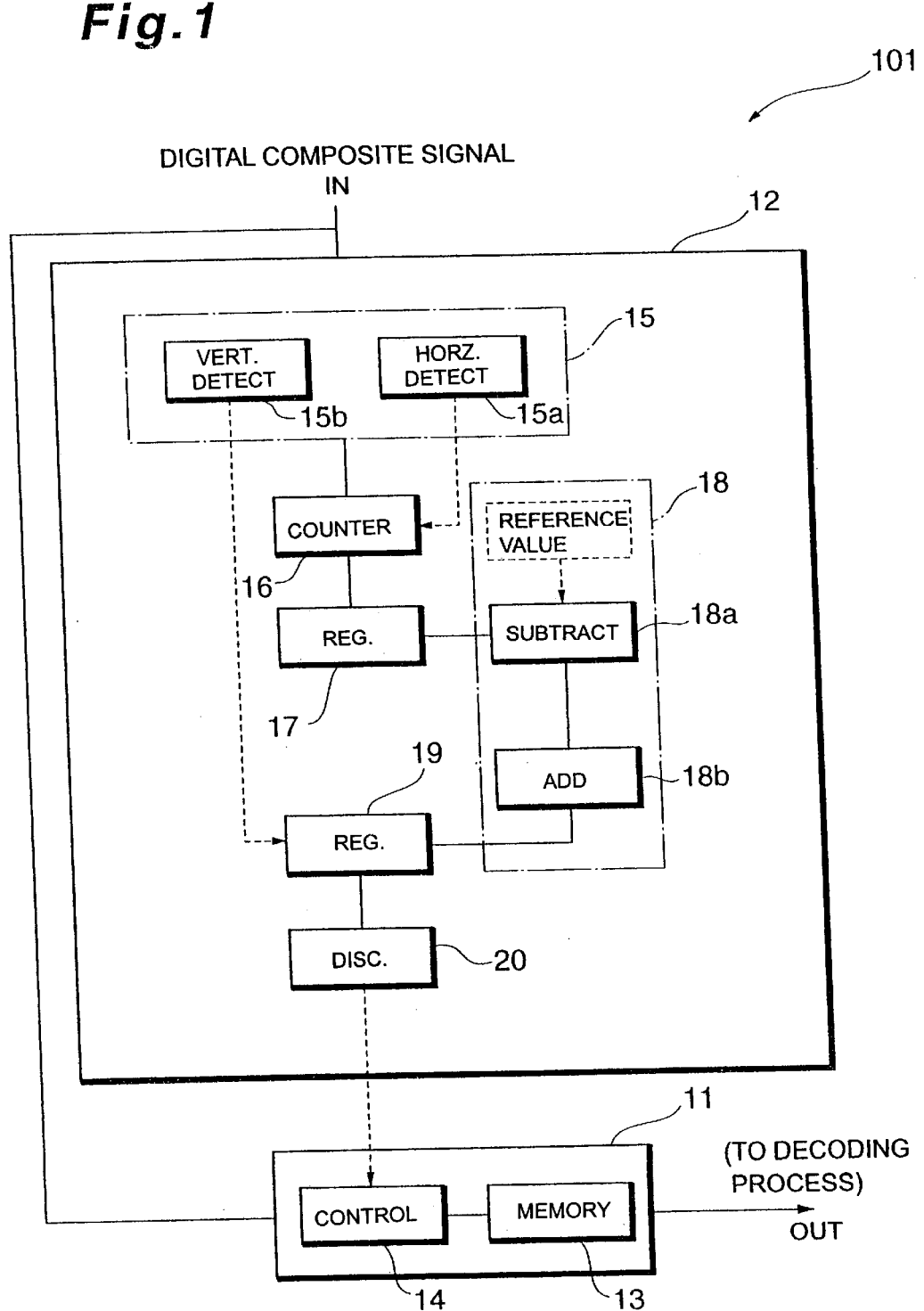
FIG. 1 is a block diagram showing a construction of a video signal processing apparatus of an embodiment 1 according to the invention.

A video signal processing apparatus 101 in the embodiment 1 is provided for the digital video decoder in order to suppress such a disturbance of the reproduced video image which is caused by the fluctuation of the number of pixel data. As shown in FIG. 1, the video signal processing apparatus 101 comprises: a conventionally well-known adjusting circuit 11 for correcting a deviation of the number of pixel data from the reference value; and a discriminating circuit 12 for discriminating whether the correction by the adjusting circuit should be performed or not.

Figure 2:
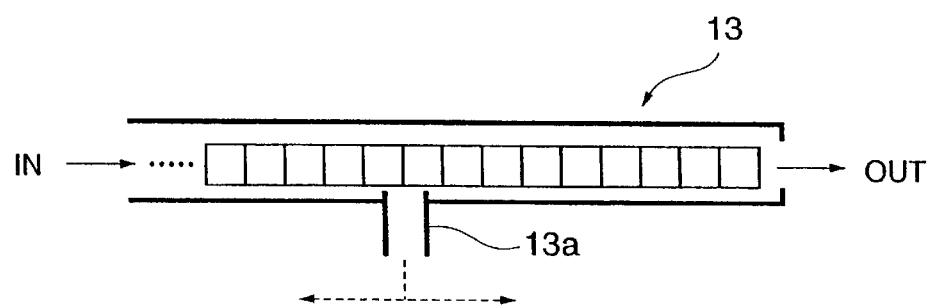
FIG. 2 is a diagram showing a memory 13 shown in FIG. 1 and a port 13a of the memory.

The adjusting circuit 11 has a memory 13 storing each of the received digital composite video signals and a control unit 14 for managing the memory by the FIFO (First In First Out) system and performing the foregoing correction to each digital composite video signal in the memory 13 in a manner similar to that in the conventional circuit. As shown in FIG. 2, the memory 13 has a data insertion/extraction port 13a for increasing or decreasing the number of pixel data of each digital video signal. The port can be arbitrarily moved under a control of the control unit 14.

In the adjusting circuit 11, to correct the deviation of the number of pixel data from the reference value, the increase or decrease of the number of pixel data of the digital video signal which is stored into the memory 13 is adjusted by the control by the control unit 14.

As a result of a comparison between the number of pixel data and the reference value, if a difference is detected between them, each digital signals in a new field subsequent to the field serving as a detection target becomes a target of the adjustment in the adjusting operation. The foregoing correction is performed to each of the new digital signals. That is, the contents of the detection mentioned above are reflected to the subsequent new field.

As conventionally well-known, the adjusting operation can be performed by an adding/deleting process of the pixel data corresponding to the blanking portion of the analog video signals. In the adding/deleting process, a process for removing or inserting redundant bits through the port 13a is executed to the blanking portion. The reproduced image is stabilized by such an adjusting operation.

The discriminating circuit 12 comprises: a sync signal detecting unit 15 for detecting both of the sync signals of each of the received digital composite video signals; a line pixel counter 16 counting the number of digital sampling data of each digital composite video signal, that is, the number of pixel data; a first register 17 holding a count value obtained by the counter; a difference adder 18 serving as a first arithmetic operating unit for sequentially accumulating a difference between the count value in the register and the reference number of pixel data per scanning line; a second register 19 storing an accumulation value of the field unit which is obtained by the difference adder; and a discriminating unit 20 for discriminating whether an adjusting operation for the correction should be performed to each digital composite video signal or not on the basis of the accumulation value of the field unit in the second register.

The sync signal detecting unit 15 has a horizontal sync signal detecting circuit 15a and a vertical sync signal detecting circuit 15b. The horizontal sync signal detecting circuit 15a detects the horizontal sync signal from the digital composite video signal and supplies a reset signal for updating the count value obtained by the counter 16 to an initial value to the counter 16 every detection of the horizontal sync signal. The vertical sync signal detecting circuit 15b detects the vertical sync signal and supplies a reset signal for updating the accumulation value of the field unit obtained by the second register 19 to an initial value to the second register 19 every detection of the vertical sync signal.

The difference adder 18 comprises: a subtracting circuit 18a for calculating a difference between the count value held in the first register 17 and the reference number of pixel data; and an adding circuit 18b for accumulating the differences which are sequentially obtained by the subtracting circuit.

The accumulation values which are sequentially obtained by the adding circuit 18b are sequentially supplied to the second register 19. When the reset signal is received from the vertical sync signal detecting circuit 15b, that is, when the latest accumulation value held in the second register is equal to an the accumulation value of the field unit, the second register supplies the accumulation value of the field unit to the discriminating unit 20.

In the video signal processing apparatus 101, as mentioned above, when the digital composite video signals are supplied to this processing apparatus, the number of pixel data is counted by the counter 16. The counter 16 continues the counting operation until the reset signal from the horizontal sync signal detecting circuit 15a is received.

When the counter 16 receives the reset signal from the horizontal sync signal detecting circuit 15a, that is, when it has completed the counting operation with respect to one digital composite video signal, the count value obtained by the counter is stored as the number of pixels of one scanning line into the first register 17. In this instance, the counter 16 starts to count the number of pixels of one subsequent new scanning lines, that is, the number of pixel data of the subsequent new digital composite video signal. As mentioned above, in the counter 16, the counting of the number of pixel data of one scanning line is executed each time the digital composite video signal is supplied.

A subtraction between each of the count values which were sequentially stored in the first register 17 and the preset reference number of pixel data is performed by the subtracting circuit 18a of the difference adder 18, so that a difference between the number of pixel data of each digital video signal and the reference number of pixel data is obtained.

The difference values which are sequentially obtained by the subtracting circuit 18a are sequentially accumulated by the adding circuit 18b. Each result of the accumulation is sequentially supplied to the second register 19. This accumulating operation is continuously executed until the second register 19 receives the reset signal from the vertical sync signal detecting circuit 15b. Thus, the fluctuation of the number of pixel data of each digital video signal, that is, the total of the differences from the number of reference data is obtained on a field unit basis.

As mentioned above, the accumulation value at the time when the second register 19 receives the reset signal becomes a result of the accumulation of the field unit with regard to the difference. The accumulation result is supplied from the second register 19 to the discriminating unit 20. In order to obtain the accumulation result regarding the subsequent new field, the second register 19 performs a predetermined updating operation to store the new accumulation value.

When the accumulation result of the field unit is supplied to the discriminating unit 20, on the basis of the accumulation result, the discriminating unit 20 discriminates whether the correction of the number of pixel data by the adjusting circuit 11 is performed with respect to the digital signal group of the subsequent new field or not.

A proper adjusting range of the field unit serving as a criterion for performing the above discrimination has previously been provided for the discriminating unit 20. When the accumulation result lies within the adjusting range, the discriminating unit 20 determines that the adjusting operation for the correction mentioned above should be executed by the adjusting circuit 11.

Figure 3:
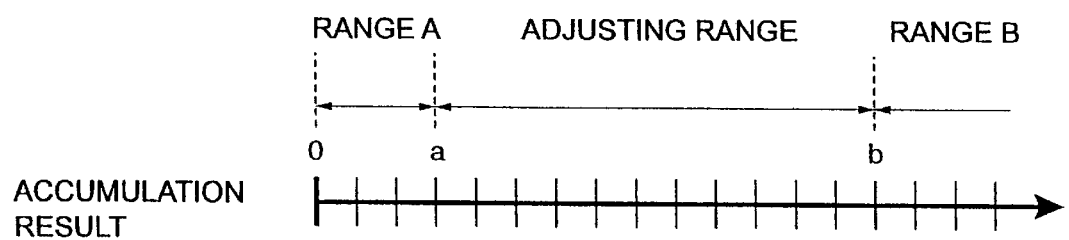
FIG. 3 is a diagram showing an example of an adjusting range in a discriminating unit 20 shown in FIG. 1.

For example, as shown in FIG. 3, the adjusting range can be specified by a pair of threshold values a and b. The threshold value a is a value such that when the accumulation result is equal to or less than the value a in each field, the image will be more stabilized if the adjustment is not performed. The threshold value b is a value such that when the accumulation result is equal to or larger than the value b in each field, the image will be more stabilized if the adjustment of the number of pixel data is not performed by the video signal processing apparatus 101. Two ranges A and B separated by the adjusting range, therefore, become non-adjusting ranges for deciding that the adjusting operation is not performed by the adjusting circuit 11.

That is, when the accumulation result lies within the range A, the discriminating circuit 12 regards the accumulation result as a value which does not need the correction as an error value from the reference value, so that it is decided that the correction is not performed to the digital signal group.

When the accumulation result lies within the range B, the discriminating circuit 12 regards the accumulation result as a value which is too large to perform the correction as an error value by the adjusting circuit 11, so that it is decided that the correction by the adjusting circuit 11 is not performed.

If the discriminating unit 20 determines that the adjusting operation should be performed since the accumulation result lies within the adjusting range, a predetermined operation signal indicative of such a decision is supplied to the control unit 14 of the adjusting circuit 11. In response to the operation signal, the control unit 14 makes the memory 13 operative so as to execute the adding/deleting process of the pixel data as mentioned above in order to make the number of pixel data in each digital video signal in the new field coincide with the reference number of pixel data.

As mentioned above, according to the video signal processing apparatus 101 of the embodiment 1 of the invention, with respect to the continuous digital composite video signals, the accumulation of the difference between each of the numbers of pixel data and the reference number of pixel data is obtained on a field unit basis by the discriminating circuit 12. Further, whether the difference should be corrected or not is automatically discriminated on the basis of the accumulation result. Thus, the proper and efficient discriminating operation can be performed.

If it is determined that the correction should be performed by the discrimination in the discriminating unit 20 of the discriminating circuit 12, the adjusting operation for such a correction is automatically executed by the adjusting circuit 11.

According to the video signal processing apparatus 101, therefore, the chain of adjusting operations including the above discrimination can be properly automatized, so that the decoding process in the decoder can be efficiently performed.

Embodiment 2

Figure 4:
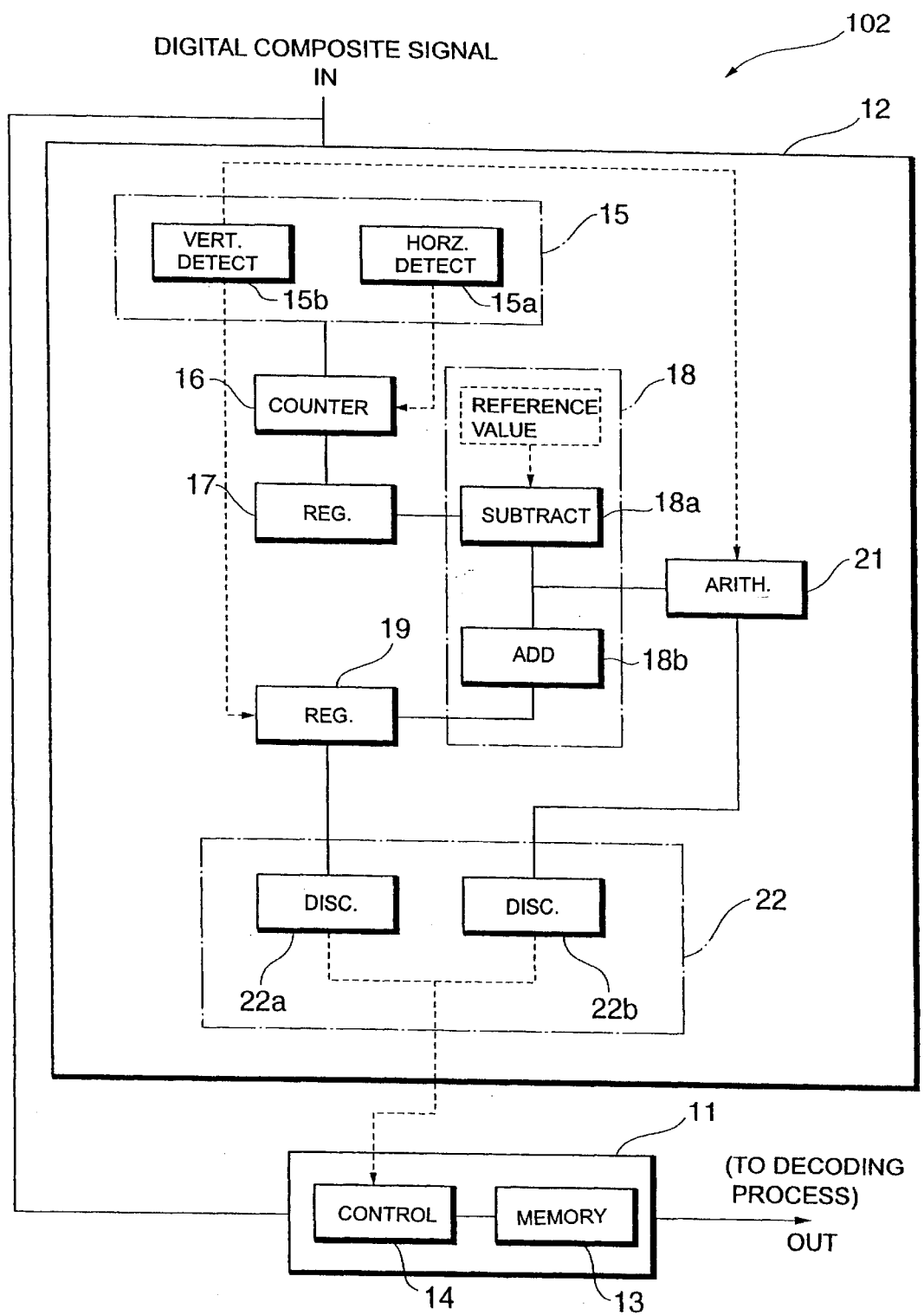
FIG. 4 is a block diagram showing a construction of a video signal processing apparatus of an embodiment 2 according to the invention.

As shown in FIG. 4, in addition to the construction of the video signal processing apparatus 101 of the embodiment 1, a video signal processing apparatus 102 in the embodiment 2 according to the invention has a second arithmetic operating unit 21 for obtaining the maximum difference with respect to each of the difference values which are sequentially obtained by the subtracting circuit 18*a*, that is, with regard to the differences between the number of pixel data of each digital composite video signal and the reference number of pixel data in each field.

A discriminating unit 22 of the video signal processing apparatus 102 has: a first discriminating circuit unit 22*a* for discriminating whether the accumulation result of the field unit stored in the second register 19 lies within a proper adjusting range similar to that in the embodiment 1 mentioned above or not; and a second discriminating circuit unit 22*b* for discriminating whether the maximum difference of each field which is obtained by the second arithmetic operating unit 21 lies within a proper predetermined adjusting range or not.

The difference values which are sequentially obtained by the subtracting circuit 18*a* are sequentially supplied to the second arithmetic operating unit 21. When the vertical sync signal is detected by the vertical sync signal detecting circuit 15*b*, that is, when the difference values supplied to the second arithmetic operating unit 21 become the difference value group of one field, the second arithmetic operating unit 21 mutually compares the difference values in the difference value group. When the vertical sync signal is detected by the detecting circuit 15*b*, a predetermined signal showing the detection of the sync signal is sent from the detecting circuit 15*b* to the second arithmetic operating unit 21.

The second arithmetic operating unit 21 obtains the maximum value and the minimum value in the difference value group by the comparison mentioned above and, further, obtains the maximum difference value showing a difference between the maximum value and the minimum value. The maximum difference value indicates the maximum value among the differences between the respective difference values with respect to the difference value group of one field. The maximum difference value obtained by the second arithmetic operating unit 21 is supplied to the second discriminating circuit unit 22*b* of the discriminating unit 22.

By the arithmetic operating process of the second arithmetic operating unit 21, for example, it is possible to detect a local and temporary fluctuation of the number of pixel data such that although the numbers of pixels of the other scanning lines excluding one scanning line in the field coincide with the reference value, the number of pixels of one scanning line is out of the reference value and equal to a value within the adjusting range.

When the discriminating unit 22 receives the supply of the maximum difference value and receives the accumulation result of the field unit from the second register 19 in a manner similar to the case in the discriminating unit 20 of the foregoing embodiment 1, as mentioned above, the first discriminating circuit unit 22*a* performs the foregoing discrimination regarding whether the accumulation result of the field unit lies within the predetermined adjusting range or not. The second discriminating circuit unit 22*b* discriminates whether the maximum difference lies within the predetermined adjusting range or not.

When a decision result is generated from each of the discriminating circuit units 22*a* and 22*b*, on the basis of these decision results, the discriminating unit 22 makes a general decision about whether the adjusting operation regarding the number of pixel data should be executed to each digital composite video signal in the field or not.

For example, if the numbers of pixel data with respect to all of the other scanning lines excluding one scanning line in the field as a discrimination target coincide with the reference value and the difference occurs between the number of pixel data regarding one scanning line and the reference value, the difference value with respect to one scanning line becomes the accumulation result of the differences in the field. Therefore, if the difference value serving as an accumulation result lies within the adjusting range, a general decision to execute the adjusting operation according to only the one difference value with regard to the subsequent new field is made.

When the local and temporary fluctuation of the number of pixel data as mentioned above occurs, therefore, if the adjusting operation to which only the decision result based on such a local fluctuation is reflected is performed with respect to the subsequent field, such an adjustment is liable to become the improper adjustment, so that it is difficult to obtain the stability of the image.

Therefore, the decision result of the second discriminating circuit unit 22*b* is considered in order to avoid the improper adjustment as mentioned above which is caused by the local generation of the difference in the field. The second discriminating circuit unit 22*b* discriminates whether the maximum value among the differences between the respective difference values lies within a predetermined adjusting range with respect to the difference occurring in each scanning line in the field or not as mentioned above. By considering the decision result of the second discriminating circuit unit 22*b* in the general decision, therefore, the improper adjustment in association with the local and temporary fluctuation of the number of pixels mentioned above is prevented.

For example, the AND of both of the decision results can be used for the general decision. In this case, only when it is determined by each of the discriminating circuit units that each of the accumulation results and the maximum difference value lies within each of the adjusting ranges, a general decision such that the adjusting operation is executed is made.

If the decision of executing the adjusting operation is made as a result of the general decision by the discriminating unit 22, in a manner similar to the case in the embodiment 1, a predetermined operation signal indicative of such a decision is supplied from the discriminating unit 22 to the control unit 14 of the adjusting circuit 11, so that the adjusting operation is executed.

As mentioned above, in the video signal processing apparatus 102 in the embodiment 2, the discrimination about whether the correction regarding the number of pixel data is executed or not is automatically performed on the basis of the accumulation result of each difference between each of the numbers of pixel data of each digital video signal in the field and the reference number of pixel data and on the basis of the maximum difference caused among the differences.

According to the video signal processing apparatus 102, therefore, in the foregoing automatic discrimination, since the local generation of the difference in the field as a discrimination target is taken into consideration, the higher accurate general decision can be made.

Embodiment 3

In the video signal processing apparatus, generally, when the foregoing period fluctuation of the analog composite video signals frequently occurs, in association with such a fluctuation, the frequent mode switching operations according to the fluctuation are caused between the adjusting mode which is made operative so as to adjust the number of pixel data of the digital composite video signals and the non-adjusting mode in which the adjusting operation is not performed. However, since such frequent mode switching operations can become a cause of the disturbance of the reproduced video image as mentioned in the paragraphs of Related Background Art, it is desirable to suppress the frequent mode switching operations for the purpose of stabilizing the video image.

In a video signal processing apparatus 103 in the embodiment 3 according to the invention, hysteresis characteristics are given with regard to the switching of the operating modes in order to suppress the frequent mode switching operations.

Figure 5:
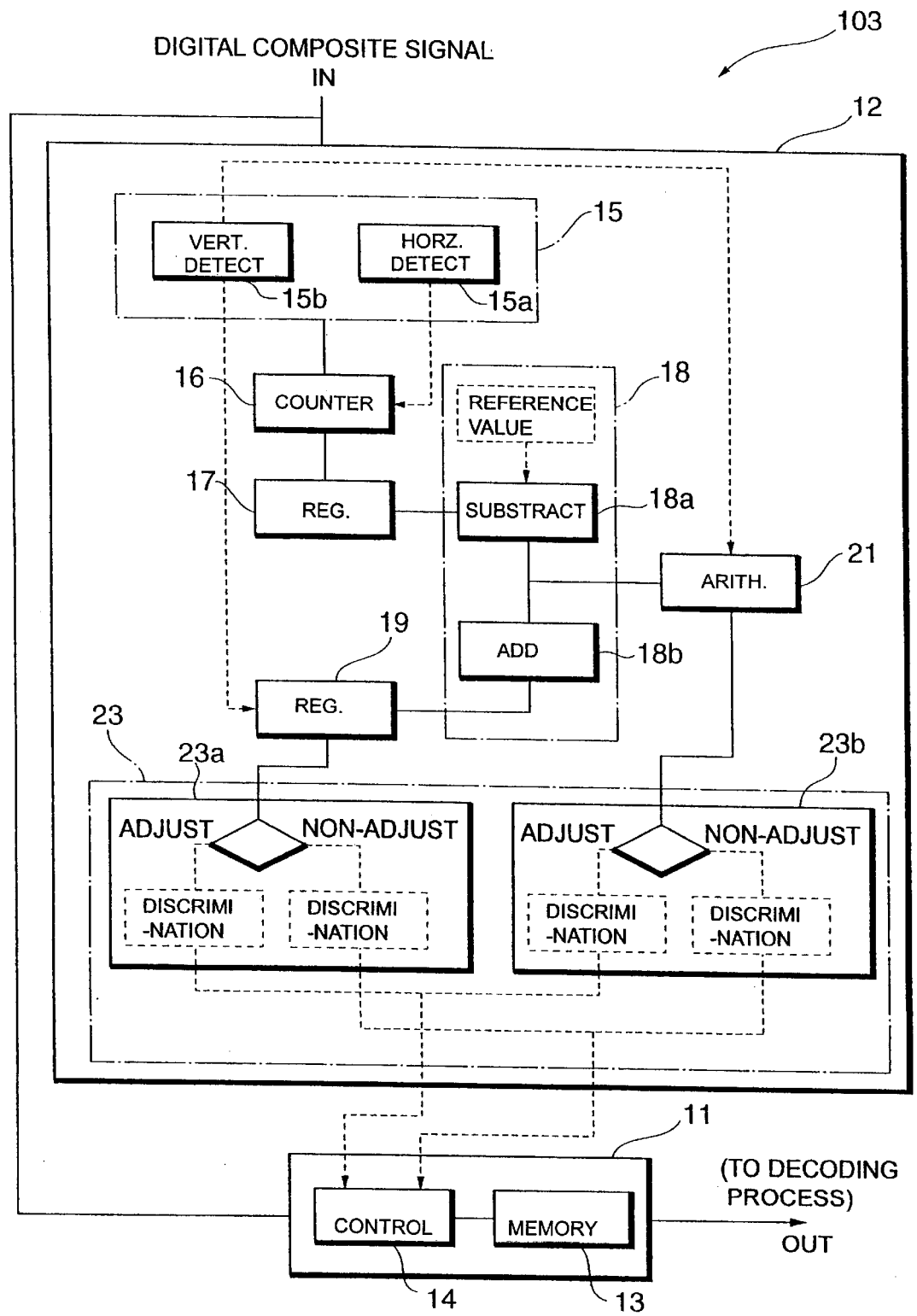
FIG. 5 is a block diagram showing a construction of a video signal processing apparatus of an embodiment 3 according to the invention.

As shown in FIG. 5, a discriminating unit 23 of the video signal processing apparatus 103 has a first discriminating circuit unit 23a and a second discriminating circuit unit 23b for performing discriminating processes similar to those in the discriminating circuit units 22a and 22b in the embodiment 2, that is, processes for discriminating whether each of the accumulation result and the maximum difference value lies within each predetermined adjusting range or not.

Two kinds of adjusting ranges having different threshold values have been preset in the discriminating circuit units 23a and 23b. One of the adjusting ranges is used in the adjusting mode between both of the operating modes and the other is used in the non-adjusting mode.

Figure 6:
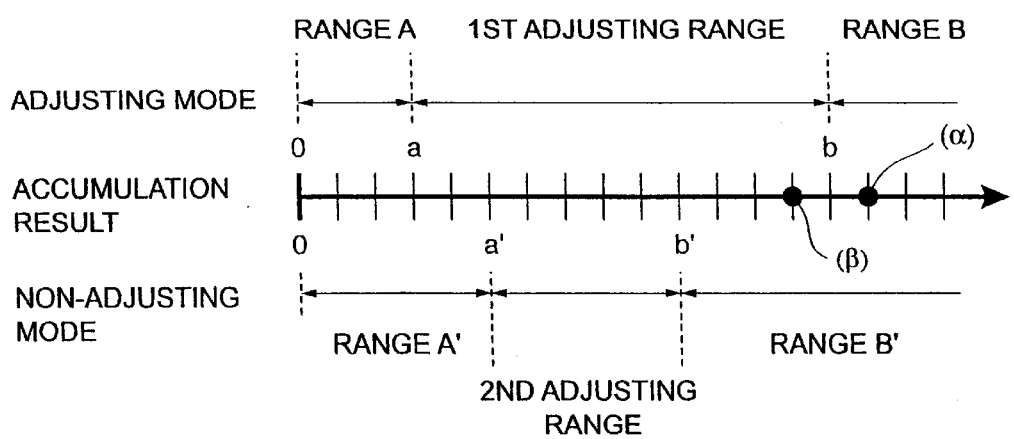
FIG. 6 is a diagram showing each adjusting range in a first discriminating circuit unit 23a shown in FIG. 5.

As an example of the adjusting ranges, in the first discriminating circuit unit 23a, as shown in FIG. 6, a first adjusting range which is specified by a pair of threshold values a and b is used in the adjusting mode, and a second adjusting range which is specified by threshold values a' and b' is used in the non-adjusting mode. Each range out of those adjusting ranges is separated into the ranges A and B by the first adjusting range and also separated into the ranges A' and B' by the second adjusting range. In the example shown in the diagram, the first adjusting range for the adjusting mode is set so as to include the second adjusting range for the non-adjusting mode.

In the second discriminating circuit unit 23b, with respect to the maximum difference value, a third adjusting range and a fourth adjusting range (they are not shown) which were set in a manner similar to the first and second adjusting ranges are used.

In the video signal processing apparatus 103, as mentioned above, in each operating mode, whether each of the accumulation result and the maximum difference value lies within each predetermined adjusting range or not is discriminated by the discriminating circuit units 23a and 23b of the discriminating unit 23. That is, two decision results from the discriminating circuit units are obtained in a manner similar to the case described in the embodiment 2.

Therefore, in a manner similar to the embodiment 2, when the two decision results are derived from the discriminating circuit units, the discriminating unit 23 makes a general decision regarding whether the correction of the number of pixel data should be performed with respect to the subsequent new field or not on the basis of the decision results, so that one of the operating modes is executed.

In the video signal processing apparatus 103 in the embodiment 3, the first adjusting range which is used in the adjusting mode where the adjusting circuit 11 executes the adjusting operation and the second adjusting range which is used in the non-adjusting mode where the adjusting circuit 11 does not execute the adjusting operation are set as adjusting ranges for the discriminating circuit units 23a and 23b as mentioned above.

Both of the above adjusting ranges are provided so as to give the hysteresis characteristics to the mode switching according to the result of the general decision in the discriminating unit 23. For simplicity of explanation of the hysteresis characteristics, explanation will now be made hereinbelow on the assumption that only the discriminating circuit unit 23a is provided for the discriminating unit 23.

In the adjusting mode, as shown in FIG. 6, if the first discriminating circuit unit 23a determines that the accumulation result exists in, for example, a value ($\alpha$) in the range B out of the first adjusting range, the operating mode is switched from the adjusting mode to the non-adjusting mode. Thus, in the new discriminating operation subsequent to the discriminating operation, the second adjusting range serving as a criterion for the non-adjusting mode is used as a criterion in place of the first adjusting range.

By the new discriminating operation, if it is determined that the new accumulation result is equal to, for example, a value which is equal to or larger than the threshold value b', that is, a value ($\beta$) in the range B' out of the second adjusting range, it is decided that the adjusting operation is not performed. Therefore, the non-adjusting mode is continued, so that the switching of the operating mode is not caused.

When there is a fluctuation from the accumulation result ($\alpha$) to the accumulation result ($\beta$) mentioned above, although the switching from the non-adjusting mode to the adjusting mode is caused again according to the discrimination of only the first adjusting range, as mentioned above, since the second adjusting range is used in the non-adjusting mode, the hysteresis characteristics are given to the discriminating characteristics for switching. Thus, the switching to the adjusting mode is prevented in order to prevent the instability of the picture plane due to the frequent mode switching operations.

As mentioned above, in the first discriminating circuit unit 23a, in order to suppress the frequent switching operations of the operating mode, the two kinds of adjusting ranges, that is, the first and second adjusting ranges which specify the different ranges are selectively used as an adjusting range which is used for discrimination in accordance with the adjusting mode and the non-adjusting mode.

In the second discriminating circuit unit 23b, in order to give the hysteresis characteristics to the discriminating characteristics for switching, the third and fourth adjusting ranges are selectively used in accordance with each operating mode in a manner similar to the case in the first discriminating circuit unit 23a.

When the decision result is derived by each of the discriminating circuit units as mentioned above, the discriminating unit 23 makes the general decision on the basis of the decision results. Consequently, the hysteresis characteristics are given with respect to the switching of the operating mode according to the result of the general decision.

Therefore, according to the video signal processing apparatus 103, since the two adjusting ranges of different threshold values are provided for the discriminating circuit units in accordance with the operating mode, the frequent inversion of the decision results by the discriminating circuit units is suppressed. In association with it, the frequent inversion of the result of the general decision can be suppressed. Thus, the frequent mode switching operations can be prevented and suppressed and the video image can be stabilized.

Embodiment 4

Figure 7:
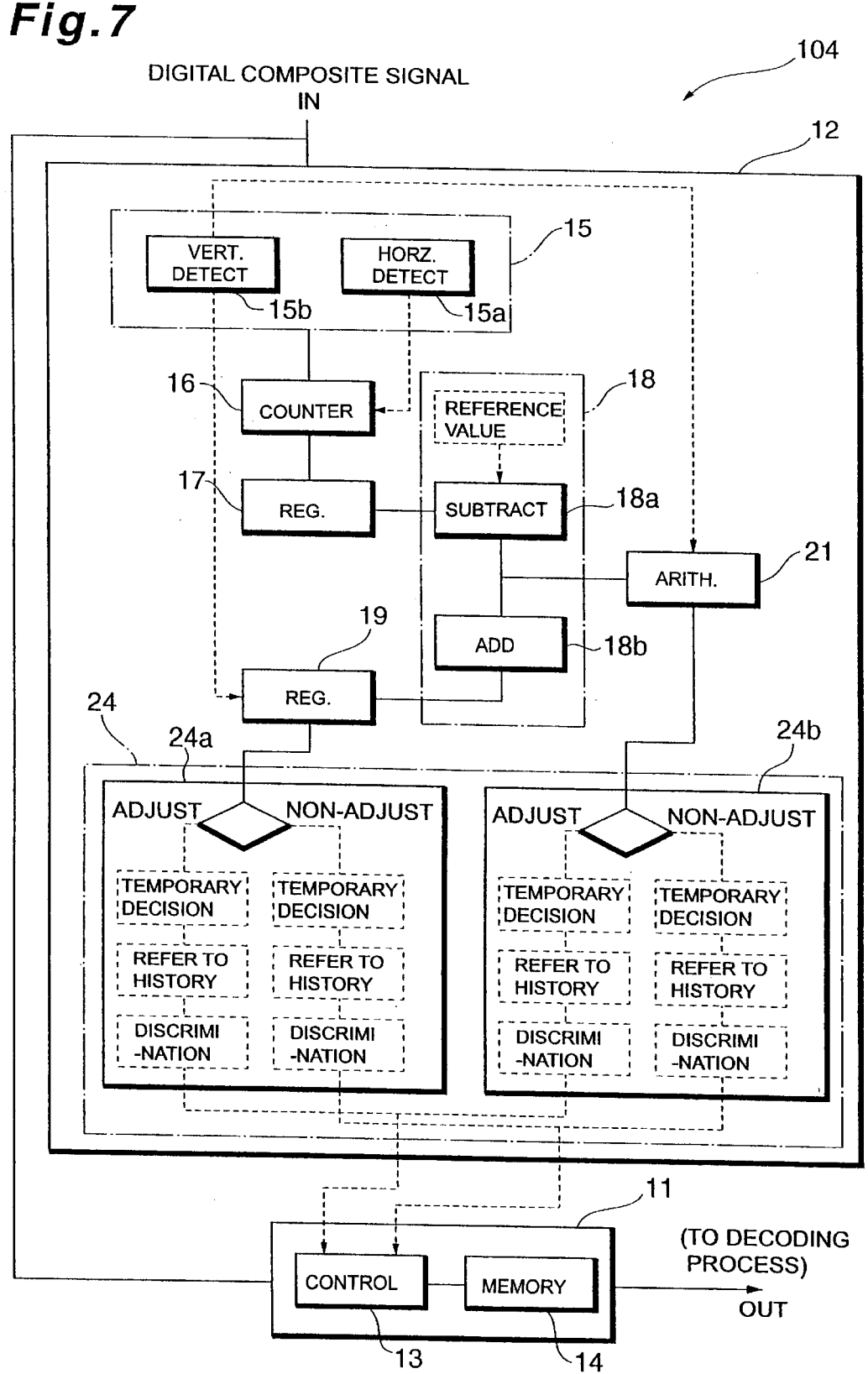
FIG. 7 is a block diagram showing a construction of a video signal processing apparatus of an embodiment 4 according to the invention.

As shown in FIG. 7, a discriminating unit 24 of a video signal processing apparatus 104 in the embodiment 4 according to the invention has a first discriminating circuit unit 24a and a second discriminating circuit unit 24b. In a manner similar to the discriminating circuit units 23a and 23b in the embodiment 3, the discriminating circuit units 24a and 24b discriminate whether each of the accumulation result and the maximum difference value lies within a predetermined adjusting range in each operating mode or not.

In order to stabilize the result of the general decision so as to suppress the frequent switching operations of the operating modes as mentioned above, the discriminating circuit units 24a and 24b use the foregoing discriminations as temporary decisions and make a final decision, which will be explained hereinafter, on the basis of the plural temporary decision results regarding the continuous fields as discrimination targets.

According to the continuous final decision results which are obtained by sequentially making the final decisions, the frequent fluctuations between the continuous temporary decision results are suppressed as will be explained hereinafter. The discriminating unit 24 makes the general decision on the basis of the final decision results of the discriminating circuit units as mentioned above.

In the final decision by each discriminating circuit unit, a history of the temporary decision results excluding the latest temporary decision result is referred to. As a history, odd number of (for example, 3 or 5) temporary decision results existing while tracing from the latest result are used. By referring to such a history, for example, one resultant contents which are in the majority of the odd number of temporary decision results are reflected to the final decision result.

Figure 8:
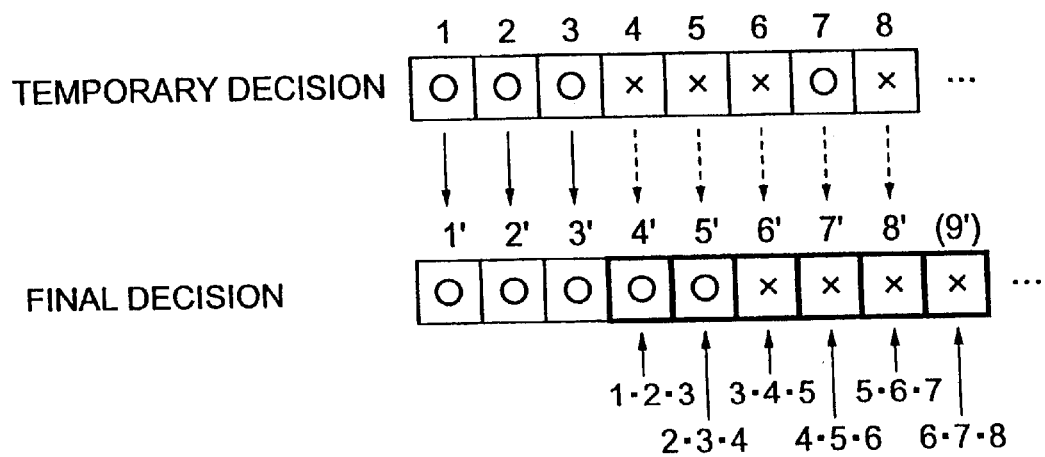
FIG. 8 is a diagram showing an example of a final decision in a video signal processing apparatus 104 shown in FIG. 7.

As an example of the final decision, a procedure of the final decision in the first discriminating circuit unit 24a will be described hereinbelow with reference to FIG. 8. Three temporary decision results are used as a history here. In FIG. 8, the temporary decision result indicating that the accumulation result lies within a predetermined range is shown by "o" and the temporary decision result indicating that the accumulation result is out of the predetermined range is shown by "x".

In the final decision in each operating mode, as mentioned above, the three temporary decision results shown by the history are referred to. Among them, two or three resultant contents showing the same contents are used in the final decision result. Therefore, fundamentally, the latest final decision result does not always coincide with the contents of the latest temporary decision result.

When considering a case of limiting to the first to third final decisions until the number of temporary decision results for the history to be referred to is equal to the specific number, the contents of each temporary decision result of the first to third decisions can be used in each final decision result. In the example shown in the diagram, since all of the first to third temporary decision results have the same contents, that is, since all of them indicate "o", all of the first to third final decision results corresponding to them indicate "o".

It is now assumed that the result in the fourth temporary decision subsequent to the third temporary decision mentioned above is inverted from the third decision result "o" to "x". However, in the fourth final decision as a final decision, since the contents of the first to third temporary decision results shown by the history to be referred to in the final decision are reflected to the final decision result as mentioned above, the final decision result indicates "o" different from the fourth temporary decision result ("x").

Even if the decision result in the subsequent fifth temporary decision indicates "x" subsequently to the fourth temporary decision, the second to fourth temporary decision results are referred to as a history for the final decision. Since the resultant contents which are in the majority among them indicate "o", the fifth final decision result indicates the same result "o" as the fourth final decision result.

Further, it is assumed that the result of the sixth temporary decision indicates the same result "x" as the fourth and fifth temporary decision results mentioned above. At this time, in a manner similar to that mentioned above, although the third to fifth temporary decision results are referred to in the final result, since the contents which are in the majority of those referred temporary decision results indicate "x", the sixth final decision result is inverted from the result "o" generated in all of the first to fifth final decisions and becomes "x". Subsequently, in a manner similar to that mentioned above, the final decisions based on the histories are sequentially made in accordance with the results of the subsequent temporary decisions.

Therefore, even if the continuous temporary decision results frequently fluctuate, since such a frequent fluctuation is hard to be reflected to the final decision result, the stable final decision result can be obtained.

In the discrimination about the continuity by the histories, for example, an even number of histories of the temporary decisions can be used without limiting to the foregoing example. In this case, the decision result which is in the majority of the histories is set to the final decision result. If the number of decision results indicative of "o" and the number of decision results indicative of "x" are equal, for example, the decision result of "o" can be preferentially used. The other various discriminating methods can be used.

Although only the first discriminating circuit unit 24a in the discriminating circuit units has been described above, also in the other second discriminating circuit unit 24b, the temporary decisions and final decision are made in a manner similar to the case of the first discriminating circuit unit 24a, so that the stable final decision result can be obtained.

The discriminating unit 24 makes the general decision on the basis of the final decision results of both of the discriminating circuit units obtained as mentioned above.

As mentioned above, in the video signal processing apparatus 104 in the embodiment 4, in each operating mode, the final decision based on the plural temporary decision results is made by each of the discriminating circuit units 24a and 24b prior to the general decision regarding whether the adjusting operation is executed or not. Thus, in the continuous final decision results, the frequent fluctuation of the continuous temporary decision results is suppressed.

According to the video signal processing apparatus 104, therefore, since the discriminating unit 24 can make the general decision on the basis of both of the stable final decision results which are obtained from both of the discriminating circuit units, the result of the general decision can be stabilized. Thus, the frequent switching operations of the operating mode can be suppressed.

Although the invention has been described with respect to the NTSC system, the invention is not limited to it but, for instance, the invention can be also applied to another television system such as a PAL (Phase Alternation Line) system.

In the video signal processing apparatus according to the invention, as mentioned above, the discriminating circuit automatically discriminates whether the fluctuation of the number of sampling data of the digital composite video signals in association with the period fluctuation of the analog composite video signals should be corrected in the decoder or not, that is, whether the fluctuation lies within the proper range where it should be adjusted or not. When the decision result showing that the correction should be performed is derived, the adjusting circuit executes the adjusting operation of the number of sampling data in accordance with the fluctuation.

According to the invention, therefore, the chain of adjusting operations including the discrimination regarding whether the adjusting operation should be executed or not can be automatized, so that the efficient decoding process of the decoder can be performed.

By setting the two kinds of adjusting ranges into the video signal processing apparatus in order to discriminate whether the correction should be executed or not, those adjusting ranges can be selectively used in accordance with the operating situations of the two kinds of operating modes. Thus, the hysteresis characteristics can be given to the switching characteristics between the operating modes and the frequency of the switching operations between the operating modes can be reduced. Thus, the more stable reproduced video image can be obtained.

The discrimination regarding whether the adjusting operation should be executed or not is made on the basis of the sum of the differences between the number of sampling data in the digital signal group and the reference value and on the basis of the maximum value of the differences, so that the higher precision adjustment can be performed.

The present invention is not limited to the foregoing embodiments but many modifications and variations are possible within the spirit and scope of the appended claims of the invention.

What is claimed is:

1. A video signal processing apparatus which is provided for a digital video decoder for decoding continuous digital composite video signals in order to suppress a fluctuation of the number of sampling data constructing each of said digital composite video signals to be processed by said decoder, comprising:

an adjusting circuit which executes a partial adding/deleting process to each of said digital composite video signals in order to correct the fluctuation of said number of sampling data of each of said digital composite video signals; and a discriminating circuit which compares said number of sampling data of each of said digital composite video signals with a reference number of sampling data of each of said digital composite video signals, discriminates whether the number of sampling data of said digital composite video signals should be increased or decreased on the basis of a difference obtained as a result of said comparison, and when said difference lies within a predetermined adjusting range, outputs an operation signal for increasing or decreasing said number of sampling data to said adjusting circuit in order to allow said adjusting circuit to execute said adding/deleting process;

wherein each of said digital composite video signals is video information of a scanning line unit including a blanking portion, and said adding/deleting process is an increase/decrease of said blanking portion.

2. A video signal processing apparatus which is provided for a digital video decoder for decoding continuous digital composite video signals in order to suppress a fluctuation of the number of sampling data constructing each of said digital composite video signals to be processed by said decoder, comprising:

an adjusting circuit which executes a partial adding/deleting process to each of said digital composite video signals in order to correct the fluctuation of said number of sampling data of each of said digital composite video signals; and a discriminating circuit which compares said number of sampling data of each of said digital composite video signals with a reference number of sampling data of each of said digital composite video signals, discriminates whether the number of sampling data of said digital composite video signals should be increased or decreased on the basis of a difference obtained as a result of said comparison, and when said difference lies within a predetermined adjusting range, outputs an operation signal for increasing or decreasing said number of sampling data to said adjusting circuit in order to allow said adjusting circuit to execute said adding/deleting process;

wherein said discriminating circuit counts the number of sampling data with respect to each of a predetermined number of digital composite video signals, accumulates a difference between each of said count values obtained by said discriminating circuit and said reference number of sampling data, and outputs said operation signal when a result of said accumulation lies within said predetermined adjusting range;

wherein in order to eliminate instability of image processes accompanied by the switching operations between an adjusting mode in which the number of sampling data is increased or decreased and a non-adjusting mode in which the increase or decrease of the number of sampling data is not performed, as such an adjusting range for the discriminating circuit, there are provided:

a first adjusting range which is used in said adjusting mode and specified by a pair of threshold values; and a second adjusting range which is specified by a pair of threshold values different from said threshold values and used in said non-adjusting mode.

3. An apparatus according to claim 2, wherein said first adjusting range includes said second adjusting range, so that hysteresis characteristics are given to switching characteristics between said modes.

4. A video signal processing apparatus which is provided for a digital video decoder for decoding continuous digital composite video signals in order to suppress a fluctuation of the number of sampling data constructing each of said digital composite video signals to be processed by said decoder, comprising:

an adjusting circuit which executes a partial adding/deleting process to each of said digital composite video signals in order to correct the fluctuation of said number of sampling data of each of said digital composite video signals; and a discriminating circuit which compares said number of sampling data of each of said digital composite video signals with a reference number of sampling data of each of said digital composite video signals, discriminates whether the number of sampling data of said digital composite video signals should be increased or decreased on the basis of a difference obtained as a result of said comparison, and when said difference lies within a predetermined adjusting range, outputs an operation signal for increasing or decreasing said number of sampling data to said adjusting circuit in order to allow said adjusting circuit to execute said adding/deleting process;

wherein said discriminating circuit counts the number of sampling data with respect to each of a predetermined number of digital composite video signals, accumulates a difference between each of said count values obtained by said discriminating circuit and said reference number of sampling data, and outputs said operation signal when a result of said accumulation lies within said predetermined adjusting range, wherein said discriminating circuit comprises:

a sync signal detecting unit which detects a horizontal sync signal provided for each of said composite video signals and a vertical sync signal provided for each digital signal group consisting of a predetermined number of said composite video signals from said continuous digital composite video signals;

a counter which counts said number of sampling data of each of said digital composite video signals and whose count value is reset to an initial value every detection of said horizontal sync signal by said detecting unit;

a first register which holds a count value obtained by said counter;

a first arithmetic operating unit which sequentially performs the calculation of said difference between said count value held in said register and said reference number of sampling data and performs said accumulation of each of said calculated result;

a second register which stores an accumulation value obtained by said arithmetic operating unit and whose accumulation value is reset to an initial value every detection of said vertical sync signal by said detecting unit; and a discriminating unit which performs said discrimination by using said accumulation value every reset of said register.

5. An apparatus according to claim 4, wherein said sync signal detecting unit has a horizontal sync signal detecting circuit for detecting said horizontal sync signal and a vertical sync signal detecting circuit for detecting said vertical sync signal, said horizontal sync signal detecting circuit sends a signal for resetting said count value of said counter, and said vertical sync signal detecting circuit sends a signal for resetting said accumulation result in said second register.

6. An apparatus according to claim 4, wherein said arithmetic operating unit comprises:

a subtracting circuit which calculates the differential number of sampling data; and an adding circuit which sequentially accumulates a result of said calculation performed by said subtracting circuit.

7. An apparatus according to claim 4, wherein said discriminating circuit compares each of said differences in said digital signal group, obtains a maximum difference among said differences from a maximum value and a minimum value obtained by said comparison, discriminates whether each of said maximum difference and said accumulation results lies within a predetermined adjusting range or not, and discriminates whether the number of sampling data of said digital composite video signals should be increased or decreased by using each of said discriminated results.

8. An apparatus according to claim 7, wherein said discriminating circuit further has a second arithmetic operating unit which obtains said maximum difference between said maximum value and said minimum value, and said second arithmetic operating unit obtains said maximum difference every detection of said vertical sync signal in said sync signal detecting unit.

9. An apparatus according to claim 8, wherein said discriminating unit has:

a first discriminating circuit unit which discriminates whether said accumulation value that is held in said second register lies within a preset adjusting region or not; and a second discriminating circuit unit which discriminates whether the maximum difference of said second arithmetic operating unit lies within another preset adjusting region or not, and said discriminating unit makes a general decision regarding the increase/decrease of said number of sampling data on the basis of both of said decision results of both of said first and second discriminating circuit units.

10. An apparatus according to claim 9, wherein said discriminating unit makes said general decision on the basis of an AND of both of said decision results.

11. An apparatus according to claim 9, wherein upon operation in said adjusting mode in which the increase/decrease of said number of sampling data is performed, when said first discriminating circuit unit determines that said accumulation value does not exist in said adjusting region and said second discriminating circuit unit determines that said maximum difference value does not exist in said adjusting region, said discriminating unit makes said general decision so as to switch from said adjusting mode to said non-adjusting mode.

12. An apparatus according to claim 9, wherein upon operation in the non-adjusting mode in which the increase/decrease of said number of sampling data is not performed, when said first discriminating circuit unit determines that said accumulation value exists in said adjusting region and said second discriminating circuit unit determines that said maximum difference value exists in said adjusting region, said discriminating unit makes said general decision so as to switch from said non-adjusting mode to said adjusting mode.

13. An apparatus according to claim 9, wherein in order to eliminate instability of image processes accompanied by frequent switching operations between said adjusting mode in which said number of sampling data is increased or decreased and said non-adjusting mode in which the increase or decrease of said number of sampling data is not performed, the adjusting region for said first discriminating circuit unit comprises a first adjusting range which is used upon operation in the adjusting mode and specified by a pair of threshold values and a second adjusting range which is specified by a pair of threshold values which are different from said threshold values and used in said non-adjusting mode, and said adjusting region for said second discriminating circuit unit comprises a third adjusting range which is used upon operation in the adjusting mode and specified by a pair of threshold values and a fourth adjusting range which is specified by a pair of threshold values which are different from said threshold values in said third adjusting range and used in said non-adjusting mode.

14. An apparatus according to claim 13, wherein said first adjusting range includes said second adjusting range and said third adjusting range includes said fourth adjusting range, so that hysteresis characteristics are given to switching characteristics between both modes in said first and second discriminating circuit units.

15. An apparatus according to claim 13, wherein each of said first and second discriminating circuit units sets a decision result in each of said modes as a temporary decision result, makes a final decision on the basis of said temporary decision results and history of a plurality of temporary decision results so as to suppress an inversion of each of said decision result, and said discriminating circuit makes said general decision on the basis of both of said final decision results made by both of said discriminating circuit units.

* * * * *